(12) United States Patent
Pyzik et al.

(10) Patent No.: US 9,321,694 B2
(45) Date of Patent: Apr. 26, 2016

(54) METHOD FOR APPLYING DISCRIMINATING LAYER ONTO POROUS CERAMIC FILTERS VIA GAS-BORNE PREFABRICATED POROUS ASSEMBLIES

(75) Inventors: Aleksander J. Pyzik, Midland, MI (US); Jun Cai, Midland, MI (US); Andrey N. Soukhojak, Midland, MI (US); Robert A. Newman, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 46 days.

(21) Appl. No.: 13/813,167

(22) PCT Filed: Aug. 17, 2011

(86) PCT No.: PCT/US2011/048038
§ 371 (c)(1),
(2), (4) Date: Jan. 30, 2013

(87) PCT Pub. No.: WO2012/030534
PCT Pub. Date: Mar. 8, 2012

(65) Prior Publication Data
US 2013/0149440 A1    Jun. 13, 2013

Related U.S. Application Data

(60) Provisional application No. 61/379,210, filed on Sep. 1, 2010.

(51) Int. Cl.
| | | |
|---|---|---|
| *B05D 1/12* | (2006.01) | |
| *C04B 38/00* | (2006.01) | |
| *B01J 35/04* | (2006.01) | |
| *B01J 37/02* | (2006.01) | |
| *C04B 41/00* | (2006.01) | |
| *C04B 41/45* | (2006.01) | |
| *C04B 41/85* | (2006.01) | |
| *C04B 111/00* | (2006.01) | |

(52) U.S. Cl.
CPC ............. *C04B 38/0038* (2013.01); *B01J 35/04* (2013.01); *B01J 37/0215* (2013.01); *C04B 41/009* (2013.01); *C04B 41/4545* (2013.01);
(Continued)

(58) Field of Classification Search
CPC   C04B 35/01; C04B 41/4545; C04B 41/4582; C04B 41/457; B01J 37/0215
USPC .................................................. 427/140, 180
See application file for complete search history.

(56) References Cited

U.S. PATENT DOCUMENTS

| 5,198,007 | A | * | 3/1993 | Moyer et al. ................ 55/523 |
|---|---|---|---|---|
| 2007/0213207 | A1 | | 9/2007 | Saha |

(Continued)

FOREIGN PATENT DOCUMENTS

| EP | 1576998 | A | 9/2005 |
|---|---|---|---|
| EP | 1775022 | A | 4/2007 |

(Continued)

OTHER PUBLICATIONS

Hiroki, H., et al., JP2009-085010, Apr. 23, 2009, Honda Motor Co. Ltd., "Exhaust Gas Control Device and Manufacturing Process of This Exhaust Gas Control Device", Machine Translation.

*Primary Examiner* — Dah-Wei D Yuan
*Assistant Examiner* — Nga Leung V Law

(57) ABSTRACT

A porous discriminating layer is formed on a ceramic support having at least one porous wall by (a) establishing a flow of a gas stream containing highly porous particles through the support to deposit a layer of the highly porous particles of a ceramic or ceramic precursor onto wall(s) of the support and (b) calcining said deposited layer to form the discriminating layer. This method is an inexpensive and effective route to forming a discriminating layer onto the porous wall.

19 Claims, 2 Drawing Sheets

(52) U.S. Cl.
CPC ......... *C04B41/85* (2013.01); *C04B 2111/0081* (2013.01); *C04B 2111/00793* (2013.01)

(56) References Cited

U.S. PATENT DOCUMENTS

2008/0283465 A1* 11/2008 Liu et al. ................. 210/496
2008/0293564 A1    11/2008 Saha
2009/0000475 A1    1/2009  Fekety et al.
2009/0239030 A1    9/2009  Cai

FOREIGN PATENT DOCUMENTS

| JP | 10-249124 A | | 9/1998 |
| JP | 2009-085010 A | | 4/2009 |
| JP | 2009085010 A | * | 4/2009 |
| WO | 2008-011167 A | | 1/2008 |

* cited by examiner

METHOD FOR APPLYING DISCRIMINATING LAYER ONTO POROUS CERAMIC FILTERS VIA GAS-BORNE PREFABRICATED POROUS ASSEMBLIES

This application claims priority from U.S. Provisional Patent Application No. 61/379,210.

The present invention relates to methods for preparing porous ceramic filters and support materials.

Porous ceramic materials are used in many filtering applications and as catalyst supports in a variety of applications. An important use for porous ceramic materials is in treating exhaust gases from combustion processes, including, for example, the exhaust gases from internal combustion engines. Porous ceramic materials are called upon to filter soot particles from the exhaust gases, and in some cases to carry a catalytic material which can catalyze the chemical conversion of certain components of the exhaust (such as $NO_x$ compounds) into benign compounds (such as $N_2$ and $H_2O$).

Various types of ceramic filters are used in these applications, including, for example, acicular mullite, cordierite and silicon carbide, among others.

There are several significant practical problems with these filters. One problem is that the pores of these filters are often significantly larger than the soot or other particles that they are designed to remove. Soot particles in particular can be 2 orders of magnitude or more smaller than the pores. The small size of the particles allows many of them to pass through the filter instead of being trapped. This problem is particularly acute during early stages of operation when filter is clean. During continued operation, some of these small particles eventually become trapped in the filter, in effect reducing the pore size as the trapped particles accumulate. As a result, filtration efficiency improves somewhat after the filter has been in use for a while. In some applications, such as automotive exhaust filters, the accumulated soot is burnt out periodically, after which the filter again becomes less efficient until another soot layer has accumulated. Therefore, the problem of reduced efficiency and the escape of soot particles or other particulate pollutants can occur frequently during the lifetime of the filter. It is desirable to provide a filter which can capture very small soot particles and which also exhibits high filtration efficiency during initial stages of operation.

One way to accomplish this is to reduce the size of the pores through the filter walls, but reducing pore size very significantly increases the pressure drop across the filter. The higher pressure drop leads to either higher operating pressures (which increases the burden the filter imposes on upstream apparatus such as an internal combustion engine) or slower gas flow rates through the filter (or both). For this reason, simply reducing the size of the pores through the filter walls is not an adequate solution.

Another approach is to apply a thin discriminating layer to the surface of the filter walls. The applied discriminating layer has smaller pores than the filter walls, and so allows the filter to capture small particles even during initial stages of operation. In principle, this effect can be achieved without an unduly large increase in pressure drop across the filter (compared to that seen with the uncoated filter). This is because the discriminating layer is thin and therefore gases have to traverse only a short distance through the highly constricted small pores of the discriminating layer. Once the gases pass through this discriminating layer, they enter into and pass through the larger pores of the filter walls, through which they can flow more easily and with less pressure drop through the filter.

The usual method for applying such discriminating layers to ceramic filters is through a slurry process. Small particles are dispersed into a liquid to form a slurry which is then passed through the filter. The particles deposit on the filter wall surfaces as they pass through to form a thin coating. This coating is then dried and calcined to produce the discriminating layer. However, since the filter is porous, the slurry will penetrate into filter pores by capillary action to occupy some of the pores of the filter. This blocks the pores and leads to increases in pressure drop, as well as a waste of coating materials. Other problems arise when the coating is dried and calcined. These steps must be performed carefully to avoid cracking and to achieve the needed physical strength. Because the carrier liquid must be removed, these drying and calcining steps tend to be slow, energy intensive and costly. Another problem with this method is that it does not perform well when the filter wall surfaces are highly porous and/or have large pores. In those cases, the pores in the filter wall tend to become plugged due to the infiltration of large numbers of particles through the pores. To make the process work in those cases, one often has to first fill the pores of the wall with a sacrificial material, followed by deposition of the discriminating layer. The sacrificial layer is then burnt off. Another approach is to sequentially deposit several individual layers, one by one, starting with large particles, and then proceeding with smaller and smaller particles. This process often requires heat treatment/calcining between the individual deposition steps. Both of these approaches are quite expensive.

Therefore, a better and more efficient method for forming a discriminating layer on a ceramic filter is desired.

EP 1 775 022 describes a process for depositing a porous catalyst coating onto a porous support. In the process, an aerosol is formed from a solution of the catalyst or a catalyst precursor. This aerosol is directed through a heating zone, where the solvent is driven off, producing very fine particles of catalyst or catalyst precursor. The air stream containing these particles is then directed through a porous filter, where they deposit onto the surfaces of the filter pores. The filter containing the captured particles is again heated to form a catalyst layer. In the process as described in EP 1 775 022, the catalyst or catalyst precursor materials deposit along the walls of the pores of the filter. This maximizes the surface area of the applied catalyst, which is important in catalytic applications to obtain fast reaction rates. EP 1 775 022 does not describe the formation of a discriminating layer.

Another problem with many ceramic filters is that they are very difficult to produce without small defects. The defects may take several forms, including, for example, small cracks and holes, and, in some cases, defects in the crystal structure of the filter material. These defects can lead to a large number of rejected parts, unless some economical method is provided for repairing the defects.

This invention is in one aspect a method of forming a porous discriminating layer on a ceramic support having at least one porous wall comprising (a) establishing a flow of a gas stream containing entrained high porosity particles of a ceramic or ceramic precursor through said at least one porous wall from a gas entry side of said at least one porous wall to a gas outlet side of said at least one porous wall, such that at least a portion of the high porosity particles deposit to form a deposited layer of high porosity particles on the gas entry side of said at least one porous wall, wherein (1) the high porosity particles have a size from 10 to 500 microns (μm), (2) the high porosity particles have a porosity of at least 50 volume-% and an apparent volume average pore diameter, as measured by mercury porosimetry, of no greater than 10 microns and (3)

said deposited layer extends only partially through the thickness of said at least one porous wall and (b) calcining said deposited layer to form the discriminating layer.

The process of this aspect of the invention is a very efficient and economical approach to forming a discriminating layer on a porous filter. In the process, the high porosity particles are captured almost exclusively at the gas entry surface of the porous walls of the support (or in defects in the walls) to form a very thin (typically no greater than 100 micron thick and preferably not greater than 30-50 microns thick) layer at the gas entry surfaces of the walls. Except at the sites of defects in the filter walls, the particles tend to deposit in at most very small quantities into the internal surfaces of the pores of the support wall(s). Therefore, the pore size of the support walls is largely unchanged except at or near the surface where the discriminating layer is applied. After the calcining step is completed, the discriminating layer has a pore size that is smaller than the pore size of the porous filter; the pore size of the discriminating layer is often at least partially determined by the pore size of the deposited high porosity particles. The discriminating layer also tends to have a somewhat high porosity due to the high porosity of the applied particles. The high porosity of the discriminating layer tends to minimize the pressure drop created by the filter. As a result, the filter often has very good filtration efficiency over a wide range of filtrate particle sizes, as well as good initial filtration efficiency. The filter also produces a pressure drop that often is very close to that produced by the uncoated support under the same operating conditions.

Another advantage of the invention is that the discriminating layer can be applied to only one side of the porous wall(s) of the support. This leaves the other side of the wall(s) available for deposition of a catalytic material or other functional material, if desired. Because no discriminating layer is applied to the other side of the wall in these embodiments, it remains possible to subsequently deposit a catalytic or other functional material onto the surface of the other side, or even into the pores of the porous wall, after the discriminating layer has been applied.

Yet another advantage of the invention, in some embodiments, is that the calcining step can be performed simultaneously with some other heat treatment step that is needed in the preparation of the underlying support and/or the finished part. For example, the calcining step may be conducted at the same time as a burn-out or other finishing heating step that is conducted on the support. An example of such a step is a final heat treatment step to remove residual fluorine from an acicular mullite support. The calcining step also can be performed at the same time as a skin or channel cap materials are fired. The ability to combine these heat treatment steps means that the calcining step may in many cases be performed at little or no incremental cost.

This invention is also a method of repairing a defect in a ceramic support having at least one porous wall having pores and at least one defect resulting in an opening in said porous wall, said opening being large relative to the pores, comprising (a) establishing a flow of a gas stream containing entrained high porosity particles of a ceramic or ceramic precursor though the support and through said defect in the porous wall from a gas entry side of said porous wall to a gas outlet side of said at least one porous wall, such that high porosity particles become lodged within said defect in said at least one porous wall to at least partially close the defect, wherein (1) the high porosity particles have a size from 10 to 500 microns and (2) the high porosity particles have a porosity of at least volume 50% and an apparent volume average pore diameter, as measured by mercury porosimetry, of no greater than 10 microns, and (b) calcining said lodged high porosity particles.

The filter product may be used in filtering applications, and is particularly useful in applications that require resistance to hot gases or liquids, such as heat exchangers, catalyst supports and filters (for example, molten metal and soot filters).

Figure 1:
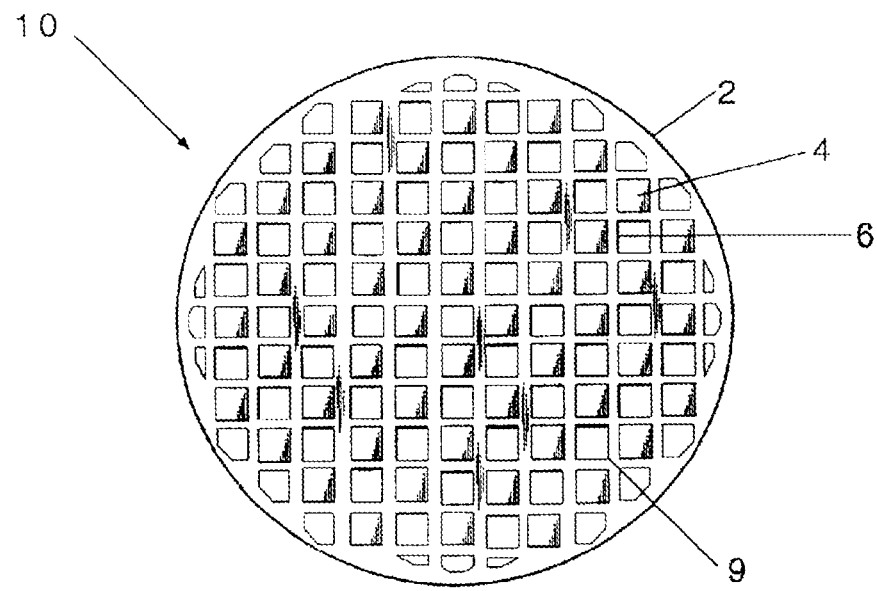
FIG. 1 is a top view of a honeycomb filter of the type useful as a starting material for the process of the invention.

Turning to FIG. 1, there is shown an embodiment of a ceramic support as is typically used in filtering and catalyst support applications. Support 10 includes peripheral wall 2 and a series of intersecting walls 6 which define axially-extending cells 4. As shown in more detail in FIG. 2, cells 4 in this particular embodiment are of two types, namely inlet cells 4A and outlet cells 4B. The inlet cells 4A and outlet cells 4B are arranged in alternating fashion in the support. Inlet cells 4A are plugged at an outlet end (indicated by arrow 11) of support 10 with plugs 8. Outlet cells 4B are plugged at an inlet end (indicated by arrow 12) of support 10 with plugs 9. During operation, a gas to be treated is introduced into cells 4A at inlet end 12 of support 10. Walls 6 are porous, which allows the gas to permeate through walls 6 into outlet cells 4B and from there out of outlet end 11 of support 10. Particulates in the gas stream are captured by porous walls 6, which operate as the active filter. Walls 6 may hold a catalytic material, which catalyzes a reaction of one or more components of the gas stream. Walls 6 have an inlet side 5, which faces an inlet channel 4A, and an outlet side 7, which faces an outlet channel 4B. As used herein, "inlet" refers to the end of the support into which gases are to be introduced during the intended end-use of the filter, and "outlet" refers to the end of the support from which gases are removed during the intended end-use of the filter. Note that the "inlet" and "outlet" designations apply to the end-use of the filter, and not necessarily to the direction of gas flow during the deposition of the discriminating layer.

The pore size of walls 6 may vary considerably, depending on the particular application for which support 10 is designed. "Pore size" is expressed for purposes of this invention as an apparent volume average pore diameter as measured by mercury porosimetry (which assumes cylindrical pores). In some embodiments, the pore size of walls 6 is from about 1 to 100 microns. For filtering combustion exhaust gases, a more typical pore size is from 5 to 50 microns, more typically from about 10 to 50 microns or from 10 to 30 microns.

The thickness of walls 6 again can vary considerably, but is typically at least 100 microns and more typically at least 200 microns or at least 400 microns. Walls 6 may be up to 5 cm thick or more in some embodiments, up to 5 mm thick in other embodiments or up to 400 microns thick in still other embodiments. The porosity of walls 6 may be as low as 5 volume-% or as high as about 90 volume-%. A preferred porosity is at least 25 volume %, a more preferred porosity is at least 40 volume % and most preferred porosity is at least 65 volume %. Porosity can be measured by various immersion or mercury porosimetry methods.

The method of the invention is especially useful for applying a discriminating layer to, or fixing defects in, supports that have large pores and/or high porosities. It is difficult, using slurry methods, to apply a discriminating layer on such supports without filling the pores with particles and plugging them or creating large pressure drops during operation. Therefore, a support of particular interest is one in which the volume average pore diameter of the wall(s) is at least 7 microns and especially at least 15 microns, up to 50 microns, up to 35 microns or up to 25 microns. Another support of interest is one in which walls(s) have a porosity of at least 50 volume %, more preferably at least 60 volume %. Supports which have both the porosity and pore sizes just mentioned are of particular interest.

A discriminating layer is applied to at least one wall 6 of support 10 by passing a gas carrying high porosity particles through such wall.

Figure 2:
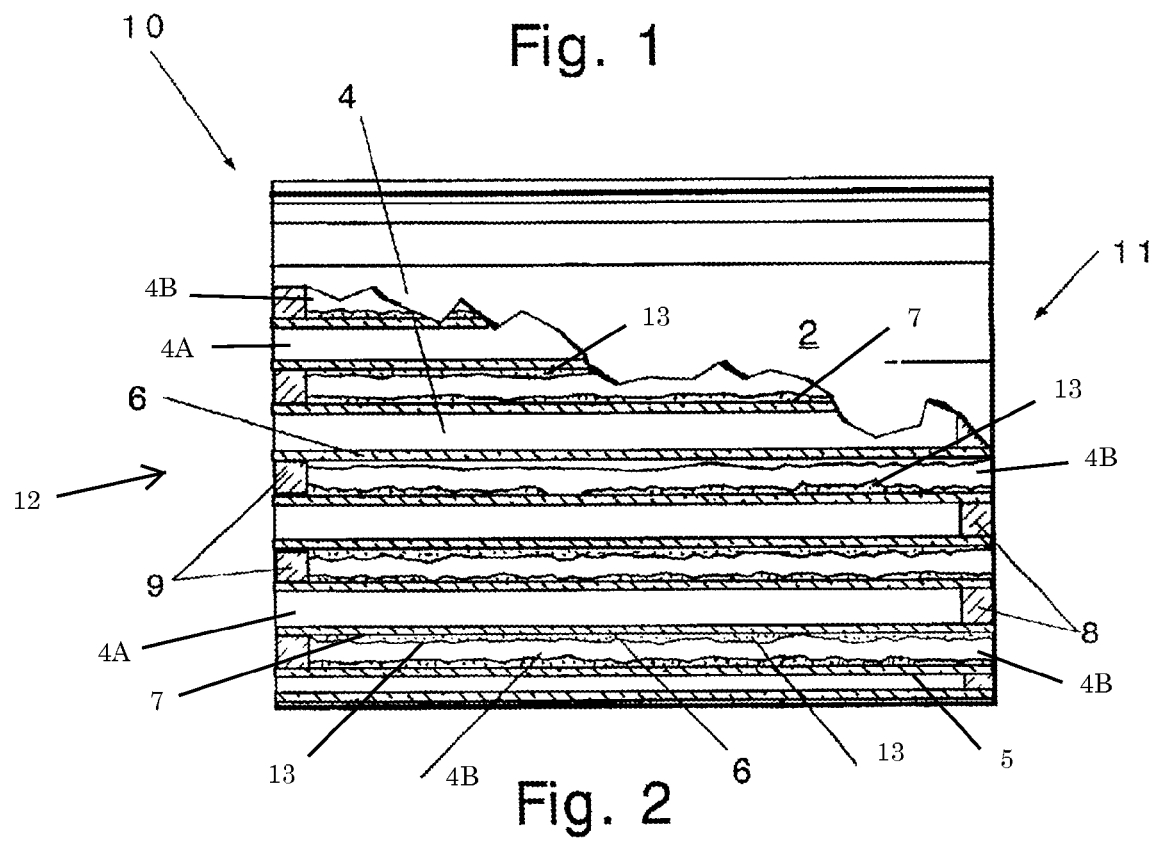
FIG. 2 is a side view, partially in section, of the honeycomb filter having a discriminating layer applied in accordance with the invention.
Figure 3A:
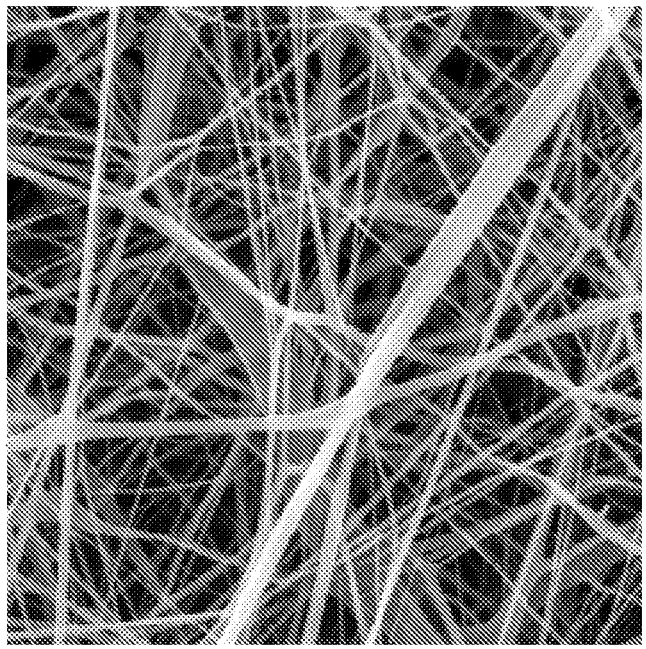
FIGS. 3A and 3B are micrographs of a suitable high porosity particle for use in the present invention.
Figure 3B:
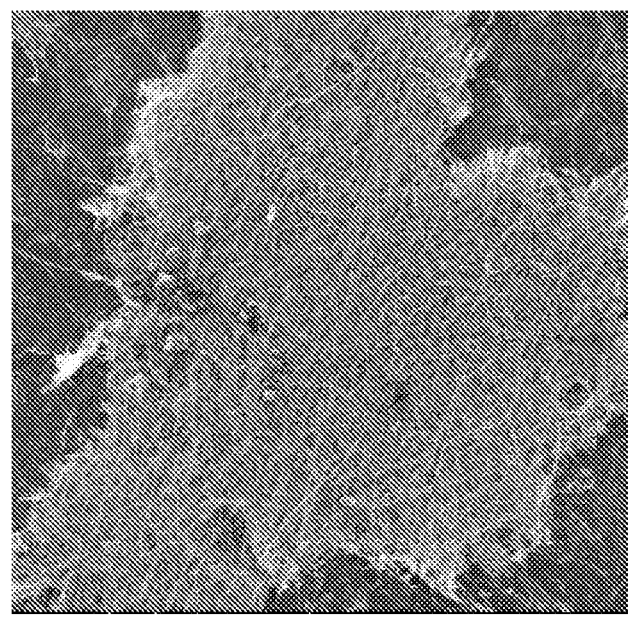

In the inventive process, a discriminating layer is applied to one or more walls 6 of support 10. A gas stream containing entrained high porosity particles is established through at least one wall 6. In the support embodiment shown in FIG. 1, and other honeycomb structures, this is easily accomplished by introducing the gas stream into outlet end 11 of one or more outlet cells 4B and allowing the gas to permeate through one or more walls 6 to adjacent inlet cells 4A and from there out of inlet end 12 of support 10. In this case, the high porosity particles will deposit mainly onto outlet side 7 of at least one wall 6 to form layer 13 as shown in FIG. 2. However, the process can be performed equally well with the gas stream flowing in the opposite direction, into inlet end 12 of inlet cells 4A, through one or more walls 6 into adjacent outlet cells 4B and then out of outlet end 12 of outlet cells 4B. In the latter case, the high porosity particles will deposit mainly on inlet side 5 of at least one wall 6. Typically, the high porosity particles will deposit on all walls 6 that border a cell into which the gas stream is introduced.

The flow of the gas stream can be produced by drawing a vacuum on the side of the support from which the gas is removed (the "gas exit" side), and/or by applying pressure to the side of the support into which the gas is introduced (the "gas entry" side). In the embodiment shown in FIG. 2, the "gas entry" side corresponds to outlet side 7 of walls 6.

The gas stream contains entrained high porosity particles of a ceramic or ceramic precursor. The high porosity particles can be distributed into the gas stream in any convenient manner, such as, for example, by flowing the gas through a bed of the particles, by spraying the particles into a moving gas stream, or other useful approach. In one convenient approach, the high porosity particles are deposited onto a screen and the screen is positioned at or near the end of the support into which the particles are to be introduced. The gas stream is then passed through the particles, through the screen and then through the support, picking up particles as they pass through and carrying them into the support. In this embodiment, the gas stream is preferably produced by drawing a vacuum through the support.

The high porosity particles are characterized by particle size, porosity and pore size. The high porosity particles have a size (largest dimension) from 10 to 500 microns. A preferred size (largest dimension) is at least 25 microns, or at least 50 microns, up to 300 microns, up to 200 microns or up to 150 microns. Certain useful high porosity particles are in the form of flakes or plates which are characterized in having a thickness (smallest dimension) from 5 to 50 microns, especially 10 to 35 microns, and a length (largest dimension) of from 10 to 500 microns, preferably from 25 or 50 microns up to 300 microns, 200 microns or 150 microns.

The high porosity particles have a porosity of at least 50 volume %, preferably at least 70 volume %. The porosity may be as high as about 95 volume %. A preferred porosity is from about 75 to 95 volume %.

The high porosity particles have an apparent volume average pore diameter, as measured by mercury porosimetry, of no greater than 5 microns, preferably no greater than 1 micron. The apparent volume average pore diameter may be as little as 0.01 microns. The apparent volume average pore diameter may be from 0.05 microns to 5 microns, or from 0.1 to 2 microns.

A useful type of high porosity particle contains ceramic fibers that are bonded together at points of contact and/or are entangled together to form a highly porous material. The spaces between the fibers define pores. The individual fibers may have diameters in the range of from 1 nanometer to 5 microns. In specific cases, the individual fibers may have diameters from, e.g., 1 nanometer to 100 nanometers, from 10 nanometers to 5 microns, or from 100 nanometers to 5 microns. Fibers of this type can be formed into a tape or web, or into three-dimensional particles, which can be crushed or ground as needed to produce particles having the sizes indicated above. Such materials can be formed, for example, using commercially available processes and equipment such as, for example, the Nanospider™ equipment marketed by Elmarco Corporation, Czech Republic. In the Nanospider process, fibers are made by an electro-spinning process from a solution of ceramic precursors. The solution is spun into overlapping nano-scale fibers of controlled diameter, and then heat treated to form a porous ceramic fiber web. The web is then comminuted to a particle size as described above. Such ceramic fiber webs are in some embodiments mullite, titania, zirconia or silica. Ceramic fiber balls that are available from Unifrax Corporation or Thermal Ceramic Corporation are also useful. These products tend to have individual fiber diameters of from 1 to 4 microns and particle sizes of between 50 and 500 microns.

At least some of the highly porous particles contain or are constituted of one or more ceramic materials or precursors to ceramic materials. Examples of ceramic materials that are useful in this invention include, for example, mullite, cordierite, perovskites, titanium oxide, zinc oxide, various zeolites, alumina, zirconia, silica, boron nitride, silicon nitride, boron carbide, silicon carbide, tungsten carbide, aluminum nitride, silicon oxynitride, silicon carbonitride, beta spodumene, aluminum titanate, strontium aluminum silicates, lithium aluminum silicates and the like. In some embodiments, the highly porous particles contain or are constituted by a ceramic material which is catalytically active.

In some embodiments, the particles are of the same material as the support, or precursors thereto, or else have a coefficient of thermal expansion that is the same as or nearly the same (±1 ppm/° C.) as that of the support. Thus, for example, agglomerated particles of mullite or mullite precursors may be deposited into an acicular mullite support. The use of the same materials for the particle and the support, or of materials having closely similar coefficients of thermal expansion, often tends to lead to a discriminating layer which exhibits less cracking and/or delamination from the support during thermal cycling.

The highly porous particles may include two or more materials, provided that at least one of them is a ceramic material or a precursor to a ceramic material. A mixture of two ceramic materials can be present in the highly porous particles. The highly porous particles may also contain or include at least one ceramic material or precursor and at least one functional material. The functional material may be, for example, a binder, a porogen, and/or a catalyst or catalyst precursor, as described below. Such a functional material in some embodiments may be present in the form of smaller particles that are held within the pore structure of the highly porous particles. If a functional material is contained in the highly porous particles, it is preferred that it represent at most 50%, more preferably at most 30% of the weight of the highly porous particles.

Similarly, two or more types of highly porous particles can be used, provided that at least some of the highly porous products are made up of or contain a ceramic material or precursor thereto. Two or more types of different highly porous particles, each made of a ceramic material or precursor, can be used. Alternatively, a mixture of two or more different highly porous particles, at least one of which contains a ceramic material or precursor, and at least one of which does not contain a ceramic material or precursor, can be used.

The highly porous particles may contain a mixture of two or more precursor materials, which during the calcining step react to form a ceramic material. An example of such a case is a mixture of particles of a highly porous aluminate material and particles of a highly porous silicate material, which can produce mullite during the calcining step.

In other embodiments, the highly porous particles contain one or more precursors that during the calcining step form a material that is catalytically active.

In addition, a mixture of highly porous particles as described above and other lower porosity particles (having porosity from 0 to less than 50 volume %) may be used to form the discriminating layer. The lower porosity particles should not constitute more than 50% by weight of the entrained particles, preferably no more than 25% by weight of the entrained particles. The low porosity particles preferably have a particle size (largest dimension) of from 10 to 200 microns, preferably from 15 to 100 microns. The low porosity particles are more preferably aggregates of smaller primary particles that have particle sizes from 0.05 to 1 micron. Aggregates of this type are preferably weakly bound together by electrostatic forces or other weak bonds, so that the agglomerates can at least partially break apart upon contacting the porous wall(s) of the support. Such agglomerates can be formed by methods such as simple tumbling or light agitation of the primary particles, by spray-drying or by light sintering.

The highly porous particles should, in the aggregate, contain at least 50% by weight, preferably at least 70% by weight of a ceramic material or precursor(s) to a ceramic material.

Porogens are useful for creating voids in the applied layer. Typically, these porogens are particulates that decompose, evaporate or in some way volatilize away during the calcining step or other heating step to leave a void. Examples include corn starch, flour, wood flour, carbon particulates (amorphous or graphitic), nut shell flour or combinations thereof.

Binders in general are organic materials that assist particles (or their constituents) to adhere to each other or to the support temporarily until the calcining step is performed. Binders include a variety of organic polymers, of which cellulose ethers are of significance.

Examples of suitable catalysts and catalyst precursors include platinum, gold, palladium, ruthenium, cerium oxide, rare earth metals and alkaline metal oxides. A catalyst precursor preferably is one that is converted to an active catalyst through some heat treatment step.

The highly porous particles carried into the support by the gas stream become deposited onto the gas-entry side one or more porous walls 6 (in FIG. 2, outlet side 7 of walls 6). During initial stages of operation, the gas stream will tend to flow towards and through areas of the support where the pressure drop is lowest. These areas are typically areas where there are larger openings in one or more porous walls 6. These larger openings may exist due to, for example, the presence of unusually large pores, defects in the crystal structure (as in acicular mullite supports, for example), or cracks or other defects in the part. Accordingly, the highly porous particles will tend to deposit more into those regions of porous wall 6 than in areas that have no defects and/or smaller pores and therefore produce higher pressure drops. In initial stages of operation, therefore, the highly porous particles will tend to become lodged into larger openings and fill those openings, until such time as the pressure drop through such opening(s) becomes approximately equilibrated with the pressure drop through the remainder of the porous wall. After the calcining step is performed, the lodged particles form a "patch" in the large opening, and in effect constitute a repair of large openings and defects in the support.

If it is desired only to repair defects and/or partially close off large openings in the pore structure of porous wall 6, the flow of the particle-laden gas stream can be discontinued at this point. Once larger openings have been filled, and the pressure drop becomes more uniform, further introduction of the particles then leads to the formation of a thin layer of highly porous particles over more or less the entire surface of the gas-entry side of porous walls 6. The flow of the particle-laden gas may be continued for any arbitrary length of time, to build up a layer of the highly porous particles of any desired thickness.

Because of their size, the highly porous particles are unable to penetrate deeply into the pores of the support walls, and so deposit mainly as a thin layer on the gas entry side of the wall(s) of the support. For application of a discriminating layer, a suitable thickness of the deposited layer is at least 1 micron and preferably at least 10 microns or at least 20 microns. The layer may be as thick as about 500 microns, but preferably is no thicker than 200 microns and more preferably no thicker than about 100 microns. An especially useful layer thickness is from 25 to 75 microns, or from 25 to 60 microns. The deposited layer forms mainly at the gas-entry surface of the support. Little or no deposition occurs within the support wall(s) pores, except along the gas inlet side.

As the highly porous particles deposit onto the gas inlet side of porous wall 6 to form layers 13, the flow path of the gas into the pores of wall 6 becomes more restricted, and pressure drop through the support increases. The pressure drop continues to increase with increasing thickness of the deposited layer. The pressure drop correlates to the size of the openings of the pores in the applied layer at the gas entry side of porous walls 6 and to the thickness of the applied layer. Therefore, this pressure drop increase can be used as a process control parameter in manufacturing settings. Correlations between pressure drop increases and the thickness of the deposited layer can be determined empirically for any particular support and particular highly porous particles. This correlation can establish a pressure drop that corresponds to any arbitrarily selected target layer thickness. The pressure drop through the support can be measured as the highly porous particles become deposited, and the particle infiltration process can be continued until a predetermined pressure drop is obtained that correlates to a target layer thickness, at which time the process is terminated.

Other process control methods include, for example, monitoring the weight gain by the support, controlling the treatment time (together with gas flow rates and loading of entrained particles in the gas stream), and the like.

The process can be repeated, if desired, by reversing the direction of the flow of the particle-laden gas, to deposit particles on the opposite side of the porous wall(s) 6. If the deposition process is applied to both sides in this manner, the composition of the layers that are applied to the opposing sides of porous wall 6 do not have to be the same, although they may be.

The deposition step can be carried out at any convenient temperature below the melting or degradation temperature of the deposited material. It is usually unnecessary to heat the support, the particles or the gas, and an advantage of this invention is that in most cases the deposition step can be performed near or at ambient temperature, such as at a temperature from 0 to 40° C.

The deposited particles are then calcined, by which it is meant that heat is applied to the deposited particles such that they form a coherent porous mass without melting. The calcination temperature will of course depend on the particular material(s) that are deposited and the particular support. The temperature is high enough that the deposited particles become bonded to each other and preferably to the substrate without melting the particles or significantly densifying the applied discriminating layer. If the deposited particles include ceramic precursors or precursors to a functional material, the calcination temperature is high enough that these precursor(s) become converted to the corresponding ceramic and/or functional material, as the case may be. The temperature should be high enough to burn out any porogen as may be used. Temperatures should be low enough that the support does not thermally degrade or become distorted. In general, a calcination temperature of from 600° to 2000° C. may be used, although specific combinations of deposited material(s) and support may require that more specific and narrower temperature ranges be used. A preferred calcination temperature is at least 800° C. but not higher than 1800° C. In some particular cases, a suitable calcination temperature is at least 1200° C. up to about 1750° C.

In some cases, the calcination step may be performed simultaneously with some other heat treatment step that is needed in the preparation of the underlying support and/or the finished part.

During the calcination step, the deposited layer forms a coherent, porous mass that is adherent to the support. A small amount of grain growth is believed to occur between adjacent particles during the calcining step, and between the deposited particles and the support, which leads to the formation of necking or bridging between the particles or between the particles and the support. However, the calcination step is performed so that the porosity of the deposited highly porous particles is essentially maintained. The thickness of the resulting coherent, porous mass is approximately that of the deposited layer before the calcination step is performed, and is preferably within the ranges mentioned above with respect to the thickness of the deposited layer. There may be thicker portions, particularly at the site of defects or other larger openings. If the calcined material is to function as a discriminating layer, it should form a substantially continuous layer over the surface of the porous wall, on the gas entry side. At least 70, or preferably at least 90% of the surface area of the porous wall(s) may be covered with the sintered layer.

The calcined layer is porous. The pore size of the calcined discriminating layer is in many cases similar to that of the highly porous particles that are deposited onto the support in the deposition step. These pores are typically smaller than those of the support wall(s), often being in the range of from 0.01 to 0.25 times the pore size of the wall(s). The pore size of the discriminating layer may be from 0.01 to 5 microns. A preferred pore size is 0.05 to 2.5 microns. The porosity of the calcined discriminating layer is preferably at least 25%, more preferably at least 40%, still more preferably at least 50% or at least 70%, and may be as high as 95%.

The support may be constructed of any ceramic material which can be made into a porous structure and which can withstand the temperatures encountered when the particles are calcined. Exemplary supports include acicular mullite, alumina, zirconia, silicon carbide, silicon nitride and aluminum nitride, silicon oxynitride and silicon carbonitride, mullite, cordierite, beta spodumene, aluminum titanate, strontium aluminum silicate and lithium aluminum silicate supports. Preferred supports are made of silicon carbide, cordierite, acicular mullite or combinations thereof. Examples of such acicular mullite ceramic bodies that are useful as the support include those described by U.S. Pat. Nos. 5,194,154; 5,173,349; 5,198,007; 5,098,455; 5,340,516; 6,596,665 and 6,306,335; U.S. Patent Application Publication 2001/0038810; and International PCT publication WO 03/082773. The silicon carbide is preferably one as described in U.S. Pat. No. 6,669,751B1, EP1142619A1 or WO 2002/070106A1. Other suitable supports are described by U.S. Pat. No. 4,652,286; U.S. Pat. No. 5,322,537; WO 2004/011386A1; WO 2004/011124A1; US 2004/0020359A1 and WO 2003/051488A1.

The support for many applications preferably has a honeycomb structure, in which multiple porous walls 6 define multiple coaxially aligned cells which, except for end-plugs, extend through the body from an inlet end to outlet end. In such a honeycomb structure, inlet cells and outlet cells alternate so that each inlet cell is surrounded by outlet cells, and vice versa. The cross-sectional shape of the individual cells may be square (as shown in FIG. 1), triangular, rhombic, rectangular, pentagonal, hexagonal, octagonal, or any other convenient shape. It is not necessary that all cells are the same size or the same shape. It is not necessary that the cells be arranged into a periodic array.

The support may be unitary, or made up of two or more segments which are cemented together or otherwise affixed together.

In particular embodiments, at least some of the cells of a honeycomb support structure having multiple axial cells are plugged at an inlet end or an outlet end, with a cement or other plugging material which requires heat treatment. Optionally a skin may be applied to the peripheral surface of the honeycomb, the skin also including a cement or other skinning material which requires heat treatment. The particles are then deposited onto one or more walls of the cells as described before, and the resulting coated support is then heat treated, to simultaneously fire the plugs and/or skin and calcine the deposited layer. In these embodiments, it becomes unnecessary to perform a separate step to calcine the deposited layer.

In other particular embodiments, the support is an acicular mullite which contains residual fluorine from a mullitization reaction. Such a support may have a honeycomb structure, and may contain cells that are plugged with a cement or other plugging material that needs heat treatment, or may have an applied skin which requires heat treatment. A layer is deposited into the acicular mullite support, and the assembly is then heat treated at a temperature sufficient to remove residual fluorine from the acicular mullite support. The deposited layer is calcined during this heat treatment step, and any plug and/or skin material that is present is also fired at the same time. Again, no separate calcining step is needed in these embodiments.

Filters provided with a discriminating layer in accordance with the invention usually, unless a very thick layer is applied, exhibit a pressure drop that is increased only incrementally from that of the uncoated support. Pressure drop increases of 100% or less from that of the untreated support are common; in many cases, the pressure drop increase is no greater than 50% or no greater than 20% and in some cases no more than 10% or even no more than 5%.

The discriminating layer also provides the filter with a higher filtration efficiency during initial stages of operation, compared to the uncoated support.

Products of the inventions are useful in a wide range of filtering applications, particularly those involving high temperature operation and/or operation in highly corrosive and/or reactive environments in which organic filters may not be suitable. One use for the filters is in combustion exhaust gas filtration applications, including diesel filter and other vehicular exhaust filters.

The products of the invention are also useful as catalyst supports for use in a wide variety of chemical processes and/or gas treatment processes. In these catalyst support applications, the support carries one or more catalyst materials. The catalyst material may be contained in (or constitute) one or more discriminating layers that are applied in accordance with the invention. The catalyst material may be contained in or constitute another layer, which may be applied under or on top of a discriminating layer applied according to the invention. The catalyst material may be contained within the pore structure of the porous wall(s) 6. The catalyst material may be applied to the opposite side of a porous wall to that on which the discriminating layer resides. A catalyst material may be applied onto the support in any convenient method.

The catalyst material may be, for example, any of the types described before. In some embodiments, the catalyst material is a platinum, palladium or other metal catalyst that catalyzes the chemical conversion of $NO_x$ compounds as are often found in combustion exhaust gases. In some embodiments, a product of this invention is useful as a combined soot filter and catalytic converter, simultaneously removing soot particles and catalyzing the chemical conversion of $NO_x$ compounds from a combustion exhaust gas stream, such as a diesel engine exhaust stream.

The following example is provided to illustrate the invention, but are not intended to limit the scope thereof. All parts and percentages are by weight unless otherwise indicated.

EXAMPLE

Nanospider® anatase titanium dioxide fiber webs having a surface area of about 60 $m^2/g$ are obtained from Elmarco Corp. These fiber webs are cast in form of thin tape having a porosity of about 90% and an average pore size of less than 0.5 micron. The fiber webs/mats are crushed into smaller pieces having thickness of about 10-25 microns and a diameter of about 100-150 microns, poured onto a 150 micron screen and distributed into a 1-2 mm layer.

A 10 cell×10 cell×7.6 cm as-mullitized acicular mullite honeycomb (31 cells per square centimeter of cross-sectional area) with fresh plugs in alternating cells is wrapped with a tape on the peripheral skin to prevent vacuum leakage and one end is connected to a vacuum source. The open end of the honeycomb is positioned under the screen, and a vacuum is applied through the honeycomb and the screen, sucking crushed fiber web particles through the screen and into the honeycomb. The vacuum is continued until the loading on the honeycomb is about 12 g/L.

The loaded honeycomb is then heat treated at 1400° C. for 6 hours. During the heat treatment step, residual fluorine is removed from the acicular mullite honeycomb, the plugs are fired, and the web particles are calcined to form a discriminating layer on the gas entry surfaces of the porous walls of the honeycomb. The discriminating layer has a thickness of about 25-70 microns, by SEM.

What is claimed is:

1. A method of forming a porous discriminating layer on a ceramic support having at least one porous wall comprising (a) establishing a flow of a gas stream containing entrained high porosity aggregates consisting of a solid ceramic or solid ceramic precursor through said at least one porous wall from a gas entry side of said at least one porous wall to a gas outlet side of said at least one porous wall, such that at least a portion of the high porosity aggregates deposit to form a deposited layer of high porosity aggregates on the gas entry side of said at least one porous wall, wherein (1) the high porosity aggregates consisting of ceramic fibers having a diameter of from 1 nanometer to 5 microns that are bonded together at points of contact or entangled together and have a largest dimension from 10 to 500 microns, (2) the high porosity aggregates have a porosity of at least 50 volume-% and an apparent volume average pore diameter, as measured by mercury porosimetry, of no greater than 10 microns and (3) said deposited layer extends only partially through the thickness of said at least one porous wall and (b) calcining said deposited layer to form the porous discriminating layer.

2. The method of claim 1 wherein the high porosity aggregates have a porosity of at least 70 volume-% and an apparent volume average pore diameter of from 0.05 to 5 microns.

3. The method of claim 2 wherein the deposited layer is at least 10 microns thick.

4. The method of claim 3 wherein the deposited layer is from 25 to 75 microns thick.

5. The method of claim 2 wherein the porous wall has a volume average pore diameter of at least 10 microns.

6. The method of claim 5 wherein the porous wall has a volume average pore diameter of from 15 to 35 microns.

7. The method of claim 2 wherein the porous wall has a porosity of at least 50%.

8. The method of claim 7 wherein the porous wall has a porosity of at least 60%.

9. The method of claim 2, wherein the porous discriminating layer has a pore size of from 0.01 to 5 microns.

10. The method of claim 9, wherein the porous discriminating layer has a pore size of from 0.05 to 2.5 microns.

11. The method of claim 10 wherein the porous discriminating layer has a porosity of from 40 to 95%.

12. A method of repairing a defect in a ceramic support having at least one porous wall having pores and at least one defect resulting in an opening in said porous wall, said opening being large relative to the pores, comprising (a) establishing a flow of a gas stream containing entrained high porosity aggregates consisting of a solid ceramic or solid ceramic precursor through the support and through said defect in the porous wall from a gas entry side of said porous wall to a gas outlet side of said at least one porous wall, such that high porosity aggregates become lodged within said defect in said at least one porous wall to at least partially close the defect, wherein (1) the high porosity aggregates consisting of ceramic fibers having a diameter of from 1 nanometer to 5 microns that are bonded together at points of contact or entangled together and have a largest dimension from 10 to 500 microns and (2) the high porosity aggregates have a porosity of at least 50 volume-% and an apparent volume average pore diameter, as measured by mercury porosimetry, of no greater than 10 microns, and (b) calcining said lodged high porosity aggregates.

13. The method of claim 12 wherein the high porosity aggregates have a porosity of at least 70 volume-% and an apparent volume average pore diameter of from 0.05 to 5 microns.

14. The method of claim 1 wherein the high porosity aggregates are flakes or plates.

15. The method of claim 12, wherein the high porosity aggregates are flakes or plates.

16. The method of claim 1, wherein step (a) is performed from 0° C. to 40° C.

17. The method of claim 12, wherein step (a) is performed from 0° C. to 40° C.

18. The method of claim 14, wherein the flakes or plates have thickness of 5 to 50 micrometers and length of from 10 to 500 micrometers.

19. The method of claim 15, wherein the flakes or plates have thickness of 5 to 50 micrometers and length of from 10 to 500 micrometers.

* * * * *